United States Patent [19]

Mashimo

[11] Patent Number: 4,470,678
[45] Date of Patent: Sep. 11, 1984

[54] ELECTRIC MOTOR DRIVE DEVICE FOR CAMERA

[75] Inventor: Yukio Mashimo, Kanagawa, Japan

[73] Assignee: Canon Kabushiki Kaisha, Tokyo, Japan

[21] Appl. No.: 386,233

[22] Filed: Jun. 8, 1982

[30] Foreign Application Priority Data

Jun. 18, 1981 [JP] Japan .................................. 56-94880

[51] Int. Cl.³ .......................... G03B 1/18; H02P 1/00
[52] U.S. Cl. ................................. 354/173.11; 318/139
[58] Field of Search ............ 354/171, 173, 204, 173.1, 354/173.11; 318/302, 306, 308, 345 B, 272, 430, 433, 434, 474, 139; 352/180

[56] References Cited

U.S. PATENT DOCUMENTS

| | | | |
|---|---|---|---|
| 3,510,743 | 5/1970 | Mortimer | 318/432 |
| 3,891,312 | 6/1975 | Aizawa et al. | 354/173 X |
| 3,909,835 | 9/1975 | Ito et al. | 354/204 |
| 4,002,959 | 1/1977 | Schadlich et al. | 318/332 X |
| 4,148,570 | 4/1979 | Ichiyanagi | 352/180 |
| 4,367,937 | 1/1983 | Mashimo et al. | 354/173 |

Primary Examiner—William B. Perkey
Attorney, Agent, or Firm—Toren, McGeady and Stanger

[57] ABSTRACT

An electric motor drive device for film winding. The conventional motor drive devices include a type in which the motor is normally kept in an operative state under a no load condition and the rotation force thereof is transmitted to a film winding mechanism during film winding. Another type actuates the motor during film winding. In the former arrangement, keeping the motor in an operative state requires less power consumption for actuating the motor and also eliminates the problem of delayed start. However, since the motor receives power even under a no load condition, a high voltage is impressed on the motor to cause vibration, beat, or the like even under a no load condition, thus causing camera vibration resulting in a blurred picture. In accordance with the present invention, this shortcoming of the conventional device is eliminated by differentiating control over the power supply to the motor under a no load condition from a power supply control in a film winding condition to ensure that no high voltage is impressed on the motor under a no load condition.

4 Claims, 2 Drawing Figures

ELECTRIC MOTOR DRIVE DEVICE FOR CAMERA

BACKGROUND OF THE INVENTION

1. Field of the Invention

This invention relates to an electric motor drive device for a camera and more particularly to an electric motor drive device of the type using a coupling means such as an electromagnetic clutch for coupling a motor and a winding mechanism.

2. Description of the Prior Art

Some of the conventional electric motor drive devices of the type using an electromagnetic clutch for controlling coupling between the motor and a winding mechanism reduce power consumption required for starting the motor by first switching off the electromagnetic clutch to start the motor under a no load condition and, then, after the lapse of a prescribed length of time, by switching on the electromagnetic clutch to accomplish winding. Others avoid a delayed start of the motor by starting it in association with the operation of a release switch of the camera, instead of starting it after completion of a photographing operation, and by thus allowing the motor to be rotating under a no load condition with the electromagnetic clutch switched off during photographing. Then, the electromagnetic clutch is switched on, upon completion of photographing, to accomplish winding by coupling the normally rotating motor with the winding mechanism. However, the ratio of current consumption between motor rotation under a no load condition and motor rotation during winding is about 1:10. Accordingly, where batteries are used as the power source, a voltage drop due to internal resistance tends to impress a higher voltage on the motor for rotation under no load than for rotation during winding. This tendency becomes more conspicuous as the number of batteries in use increases. Furthermore, the rating of the motor is generally set either at the voltage required for winding or lower than that in consideration of the working range of battery capacity, the efficiency of the motor, etc. With the rating of the motor set in this manner, a high voltage which exceeds the rating, is impressed on the motor. In a high speed type motor drive device, many batteries, say 12 to 20 batteries are used. In such a case, an excessively high voltage is impressed on the motor when it rotates under no load. The excessive voltage then results in vibration, beat, etc. This not only gives a disagreeable feeling, but also gives blurred pictures due to camera vibration.

Under a no load condition, the number of revolutions of the motor is larger than the number of revolutions during winding even if the voltage is the same. However, with the excessive voltage impressed, the number of revolutions further increases under a no load condition to eventually shorten the mechanical life of the motor.

It is an object of the invention to provide an electric motor drive device for a camera which solves the above problem of the prior art by switching over the motor drive circuit between operation under a no load condition and operation under a loaded condition in such a way as to lower the voltage impressed on the motor under a no load condition.

It is another object of the invention to provide an electric motor drive device for a camera in which a power supply control circuit for the motor thereof is switched over between operation under a no load condition and operation under a loaded condition in such a way to prevent the voltage from being impressed on the motor from increasing due to an increase in the terminal voltage of the power source, so that any excess voltage can be prevented from being impressed on the motor during operation under a no load condition.

These and further objects, features and advantages of the present invention will become apparent from the following detailed description of a preferred embodiment thereof taken in conjunction with the accompanying drawings.

SUMMARY OF THE INVENTION

It has now been found that these objects may be attained in a motor drive device which includes a motor for driving a film winding mechanism, and a control circuit for controlling the voltage to be impressed on the motor from a power source. The circuit is in a first control state when the motor is driving the film winding mechanism and is in a second control state when the motor is in a non-load state. The circuit acts to suppress the voltage impressed on the motor in the second control state to make it lower than the impressed voltage in the first control state, so that an increase in the voltage to be impressed on the motor due to an increase in the power source voltage under a no load condition can be prevented.

DETAILED DESCRIPTION OF A PREFERRED EMBODIMENT

Figure 1:
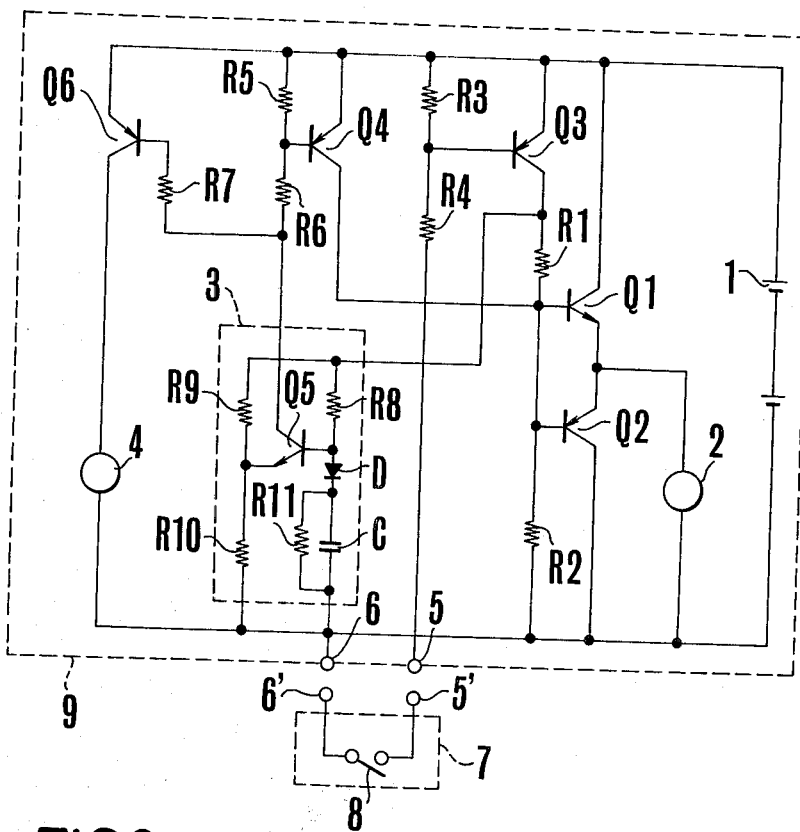
FIG. 1 is a circuit diagram showing an electric motor drive device in an embodiment of the present invention.

Referring to FIG. 1, there is shown the circuit arrangement of an embodiment of the invention. The embodiment includes a battery 1 serving as a power source; a motor 2; a transistor Q1 connected in series with the motor 2 for controlling the power supply to the motor 2; a transistor Q2 which is connected in parallel with the motor 2 and is rendered conductive by a current flowing to a resistor R2 to quickly bring the motor to a stop by braking its rotation when the power supply to the motor 2 is stopped by the transistor Q1; and a transistor Q3. The transistor Q3 is on-off controlled by a switch 8 through a resistor R4 connected to another resistor R3 which is intermediate the base and emitter of the transistor Q3. The switch 8 turns off upon completion of the winding action of a camera body 7 in response to, for example, the trailing curtain of a shutter and turns on upon completion of photographing. The output of the transistor Q3 is supplied to the base of the transistor Q1 through a timer circuit 3 and a resistor R1.

A transistor Q4 is on-off controlled by the output of the timer circuit 3 through a resistor R6 which is connected to a resistor R5 intermediate the base and emitter of the transistor Q4. The output of the transistor Q4 is supplied to the base of the transistor Q1. There is provided an electromagnetic clutch 4. Power supplied to the clutch 4 is controlled by a transistor Q6, which is on-off controlled by the output of the timer circuit 3 through a resistor R7 in the same manner as the transistor Q4.

In the timer circuit 3, there are provided a charging resistor R8; a charging capacitor C; resistors R9 and R10 which determine the emitter potential of the transistor Q5; a diode D for preventing a reverse current; and a resistor R11 for discharging. The output terminal of the transistor Q5 is connected to the input terminal of the transistor Q4 through the resistor R6 and also to the input terminal of the transistor Q6 through the resistor R7. Reference numerals 5 and 6 identify terminals of the electric motor drive device 9. The terminal 5 is connected to the transistor Q3 through the resistor R4 and the terminal 6 to the ground of the circuit. The camera body 7 is provided with terminals 5' and 6' which are connected to the above-mentioned switch 8. When the electric motor drive device is mounted on the camera body 7, the terminals 5 and 6 are respectively connected to the terminals 5' and 6'.

Figure 2:
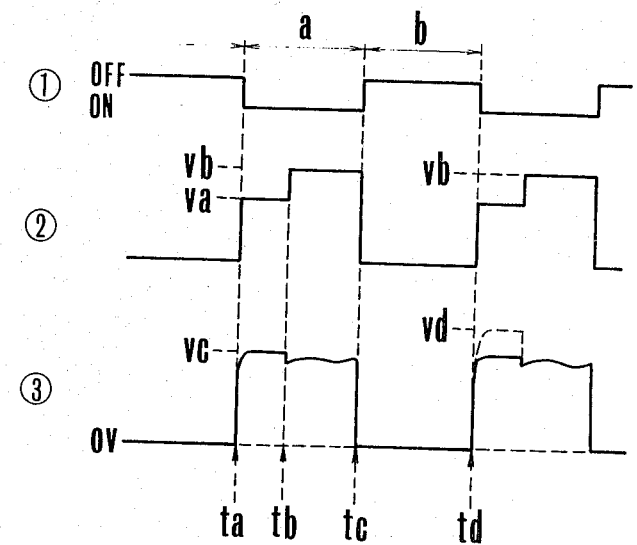
FIG. 2 is a waveform chart showing the operation of the circuit shown in FIG. 1.

FIG. 2 is a waveform chart illustrating the operation of the circuit of FIG. 1. In FIG. 2, a waveform ① represents the operation of the switch 8. A section a represents a winding section and another section b a photographing section. A waveform ② represents the input voltage of the transistor Q1 which controls the power supply to the motor 2. Reference symbols va and vb respectively indicate voltage levels. Another waveform ③ represents a voltage to be impressed on the motor 2. Symbols vc and vd indicate voltage levels and ta-td respectively indicate the lapse of time.

Referring now to FIG. 2, the device, which is shown in FIG. 1, operates as described below:

When the switch 8 turns on with photography completed at ta, as shown in FIG. 2 (see the wavefrom ① ), the terminals 5 and 6 are connected to each other through the terminal 5', the switch 8 and the terminal 6'. This causes the base current of the transistor Q3 to flow to the resistor R4 to turn on the transistor Q3. The output voltage of the transistor Q3 is divided by the resistors R1 and R2 (the voltage va of the waveform ② ) and is impressed on the input terminal of the transistor Q1. As a result of this, the transistor Q1 turns on to effect the power supply to the motor. Then, the motor begins non-loaded rotation. Meanwhile, since the output voltage of the transistor Q3 is also impressed on the timer circuit 3, the capacitor C is charged through the resistor R8. At the point of time tb, shown in FIG. 2, the charge voltage of the capacitor C exceeds the emitter potential determined by the resistors R9 and R10. Accordingly, the transistor Q5 turns on. The output current of the transistor Q5 flows to the resistors R6 and R7 turning on the transistors Q4 and Q6.

With the voltage Q4 thus turned on, the output voltage (the voltage vb of the wave form ② ) is supplied to the transistor Q1 with its high voltage unchanged. Concurrently, with the transistor Q6 turned on, the power supply is effected to the electromagnetic clutch 4. The clutch 4 then couples the motor 2 with the winding mechanism to transmit the driving force of the motor 2 to the winding mechanism, which then performs film winding. During this film winding action, a larger current flows to the motor than during the non-loaded rotation. Then, the terminal voltage of the power source battery decreases due to the influence of the internal resistance. Therefore, although the transistor Q4 turns on at the point of time tb, as mentioned above, a voltage that is actually impressed on the input terminal of the transistor Q1 decreases in proportion to the power source voltage.

Accordingly, the voltages impressed on the motor during non-loaded rotation and during film winding are illustrated at ③ in FIG. 2. At the waveform ③ , time ta-tb represents the voltage during non-loaded rotation and time tb-tc the voltage during film winding.

When the time comes to the point tc, winding is completed and the switch 8 turns off. As a result of this, the transistors Q3 and Q1 turn off to cut off the power supply to the motor 2. However, the motor 2 is urged to further rotate by the force of inertia. Since the motor 2 kept in operation by the force of inertia is equivalent to a generator, the base current of the transistors Q2 flows through the resistor R2 turning on the transistor Q2. The transistor Q2 then short-circuits the two ends of the motor 2. Then, a short-circuit current, which flows in a direction which obstructs the rotation of the motor, promptly stops the motor from rotating. Furthermore, when the switch 8 turns off, the transistor Q3 turns off cutting off the power supply from the power source. Then, the timer circuit turns off, turning the transistor Q4 off. The transistor Q6 also turns off. Therefore, the power supply to the electromagnetic clutch 4 is also cut off. If, at this time, the photographing release button is continuously depressed, the camera continuously begins photographing. Upon completion of photographing, the switch 8 turns on repeating the actions described above and thus continuous photography is carried out.

The point of time td of FIG. 2 shows that arrangement having the voltage vb indicated by a dotted line supplied to the transistor Q1 without lowering the voltage obtained under a no load condition, unlike the arrangement of the present invention, would result in a voltage vd impressed on the motor as indicated by a dotted line.

As described in the foregoing, the electric motor drive device, according to the present invention, is thus characterized by the arrangement in which the power supply control by the power supply control circuit, when the motor is not loaded, is differentiated from the power supply control when the motor is loaded. This arrangement permits a lower voltage to be impressed on the motor even if the terminal voltage of the power source increases when the motor is under a non-loaded condition. Therefore, the invntion solves the problem relative to an abnormal increase in the number of revolutions of the motor and to the vibration of the camera incidental to the non-loaded rotation of the motor. The life of the motor can also be increased in accordance with the invention.

What is claimed is:

1. A motor drive circuit comprising:
   (a) a motor for driving a film winding mechanism, said motor having a first rotation mode where its rotative power drive the film winding mechanism and a second rotation mode where the motor rotates without driving the film winding mechanism;
   (b) a power source, the output voltage of said power source taking a higher value when in said second rotation mode then when in said first rotation mode; and
   (c) a drive circuit for applying the output voltage of said power source to said motor, said circuit changing over the condition of application of the output voltage of said power source to said motor with selection of the first and second rotation modes, wherein when the motor is in the second rotation mode, said circuit decreases the output voltage of said power source before it is applied to said motor, whereby the output voltage of said power source to be applied to said motor is changed over between the first mode and the second mode so that as the output voltage of the power source to be applied to the motor is decreased when in the second mode, substantially the same voltage being applied to the motor in the first and second modes.

2. A motor drive circuit comprising:
(a) a motor for driving a load, said motor having a first rotation mode where its rotation power drives said load and a second rotation mode where it rotates without driving said load;
(b) a power source, the output voltage of said power source taking a higher value when in said second rotation mode than when in said first rotation mode; and
(c) a drive circuit for applying the output of said power source to said motor, said circuit changing over the condition of application of the output voltage of said power source to said motor with selection of the first and second rotation modes, wherein when in the second rotation mode, said circuit decreases the output voltage of said power source before it is applied to said motor, whereby the output voltage of said power source to be applied to said motor is changed over between the first mode and the second mode so that as the output voltage of the power source to be applied to the motor is decreased when in the second mode, substantially the same voltage being applied to the motor in the first and second modes.

3. A motor drive circuit comprising:
(a) a motor for driving a load, said motor having a first rotation mode where its rotative power drives said load, and a second rotation mode where it rotates without driving said load;
(b) a power source, the output voltage of said power source taking a higher value when in said second rotation mode than when in said first rotation mode; and
(c) a drive circuit including a transistor having main electrodes connected between said power source and said motor, wherein applied to a control electrode of said transistor is a voltage of a first value when in said first rotation mode, or another voltage of a second value lower than said first value when in said second rotation mode, whereby the voltage to be substantially applied to the motor is made substantially identical between the first and second rotation modes.

4. A motor drive circuit comprising:
(a) a motor for driving a load, said motor having a first rotation mode where its rotative power drives said load, and a second rotatiom mode where it rotates without driving said load;
(b) a power source, the output of said power source taking a higher value when in said second rotation mode than when in said first rotation mode;
(c) means for reducing the output voltage of said power source; and
(d) a control circuit for applying the reduced output voltage of said power source by said reducing means to the motor when in the second rotation mode, and for applying the output voltage of said power source to the motor without recourse to said reducing means when in the first rotation mode.

* * * * *